United States Patent [19]

Bokel

[11] Patent Number: 5,067,827
[45] Date of Patent: Nov. 26, 1991

[54] MACHINE BEARING ARRANGEMENT WITH FORM-MEMORY DEFORMABLE ELEMENT

[75] Inventor: Arnold Bokel, Schwebheim, Fed. Rep. of Germany

[73] Assignee: SKF GmbH, Schweinfurt, Fed. Rep. of Germany

[21] Appl. No.: 492,423

[22] Filed: Mar. 6, 1990

Related U.S. Application Data

[63] Continuation of Ser. No. 232,292, Aug. 15, 1988, abandoned.

[30] Foreign Application Priority Data

Aug. 14, 1987 [DE]  Fed. Rep. of Germany ....... 3727151

[51] Int. Cl.⁵ ............................................. F16C 35/06
[52] U.S. Cl. .................................... 384/537; 384/510; 384/517; 384/912
[58] Field of Search ............... 384/517, 563, 537, 912, 384/585, 584, 510

[56] References Cited

U.S. PATENT DOCUMENTS 3,934,957  1/1976  Derner .............................. 384/563
4,173,376  11/1979  Standing et al. .................. 384/517

FOREIGN PATENT DOCUMENTS 1023637  3/1966  United Kingdom .

OTHER PUBLICATIONS

"Use of Form-Memory Alloys in Engineering" appearing in Zeitschrift fur Wirtschaftliche Fertigung, No. 12, 1986 pp. 703+ (1986).

Primary Examiner—Lenard A. Footland
Attorney, Agent, or Firm—Rosen, Dainow & Jacobs

[57] ABSTRACT

Spacer rings of a form-memory alloy, alternatively known as memory metals, are used in the form-locking or fastening of bearings on shafts and in housings. Radial or axial expansion when the critical $A_S$ temperature of the alloy is exceeded results in firm clamping in the direction concerned. The use of alloys with a one-way characteristic allows the bearing, after heating, to remain in operable condition at all operating temperatures.

11 Claims, 2 Drawing Sheets

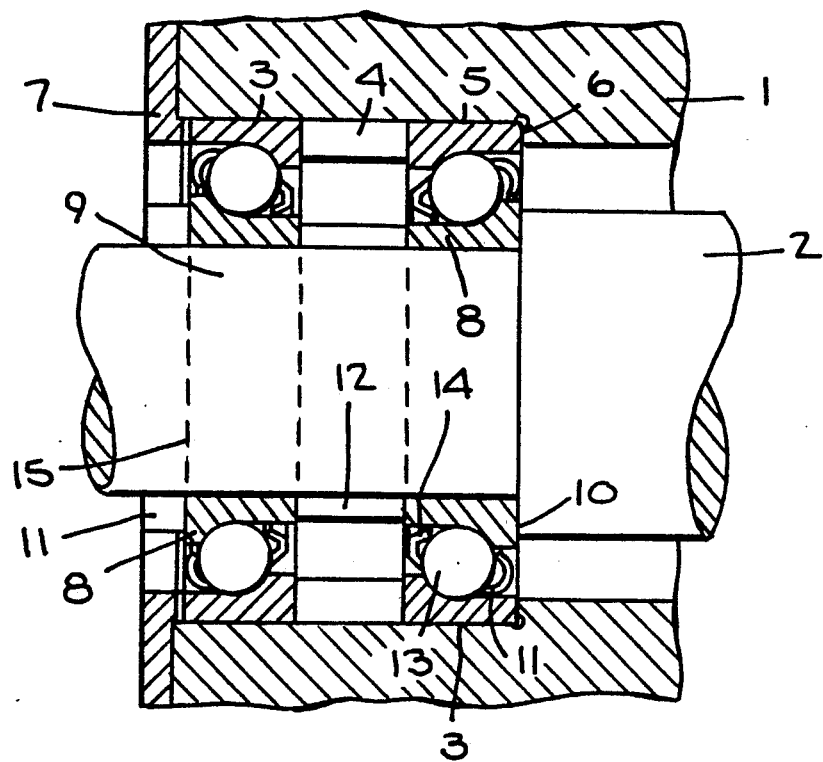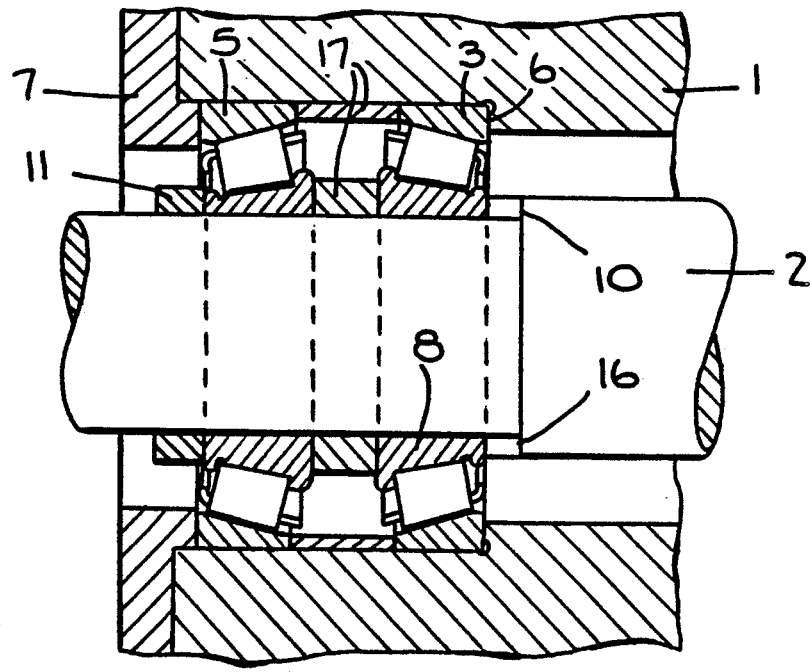

MACHINE BEARING ARRANGEMENT WITH FORM-MEMORY DEFORMABLE ELEMENT

This application is a continuation of application Ser. No. 232,292, filed Aug. 15, 1988, abandoned.

The invention relates to a machine bearing arrangement, and in particular to a bearing having a deformable element used to secure the bearing in or to a rotating or stationary machine member.

BACKGROUND OF THE INVENTION

In a spindle bearing according to Swiss Patent 407,666, two angular contact rolling bearings are provided in a letter O arrangement and fixed at a distance apart. Spacer rings are arranged both between the inner bearing rings and between the outer bearing rings. The outer lateral surfaces of the races lie against fixed edge surfaces or are braced by retaining rings. Upon assembly, particularly in the case of prestressed bearings, a suitable compression tool must be provided which in the known letter O arrangement, for example, presses the inner bearing rings together before a deformable element such as a retaining or fastening ring is fixed, snapped in or the like. The same holds true for the outer bearing rings in bearings in a letter X arrangement. Especially in bearings with large dimensions, assembly is often performed in situ, where no suitable compression tools are available or such tools first have to be procured, each in the right size. The expense in this case is considerable.

BRIEF DESCRIPTION OF THE INVENTION

The object of the invention is to provide a bearing of the type mentioned at the beginning so that no costly tools have to be used for mounting or for assembly.

This object is accomplished in accordance with one aspect of the invention in that the deformable element is constituted of a form-memory alloy.

Form-memory alloys, alternatively called memory metals, are obtainable on the free market and are described, for example, in the article "Anwendung der Formgedachtnis-Legierungen in der Technik" [Use of form-memory alloys in engineering], appearing in "Zeitschrift fur wirtschaftliche Fertigung, " No. 12, 1986, page 703 ff, whose contents are hereby incorporated by reference. Such alloys have the property of suddenly altering their dimensions at a critical predeterminable temperature, the so-called $A_S$ temperature. In this connection, alloys with a one-way characteristic, which retain their increased extension or size assumed when the $A_S$ temperature is exceeded, are obtainable. Another family of alloys has a reversible, i.e., a two-way characteristic, wherein a definite expansion is produced when the critical temperature is exceeded or alternatively when there is a drop below such temperature.

Pursuant to this aspect of the invention, a deformable element, for example, an annular element composed of such a form-memory alloy, is used for securing bearing rings in place. The deformable element is placed loosely in an annular space provided therefor between the respective bearing ring and a fixed surface of the machine member or part on or in which fastening is to take place. After mounting or after complete assembly of the bearing, the deformable element, the bearing and/or the entire machine-part unit is heated to over the critical $A_S$ temperature, whereby the deformable element expands and fixes the bearing ring form-lockingly and/or force-lockingly in the direction of expansion and force-lockingly transverse thereto. In this connection, the desired final degree of expansion may be precalculated using the data or properties of the form-memory alloy and the dimensions of the deformable element, whereby the bearing ring is definitely clamped in place. The deformable element described, of a form-memory alloy, is universally applicable for fastening bearing rings of all kinds and, in addition, is particularly advantageous for fastening in hard-to-reach places.

According to a further feature of the invention, a form-memory alloy having a one-way characteristic with an $A_S$ temperature of between 40° and 50° C. is selected for the deformable element. The one-way characteristic is then an advantageous response, because, after the critical temperature has been exceeded as designated upon mounting, any subsequent drop below such temperature no longer has any effect on fastening. In this connection, an $A_S$ temperature in a range over the maximum ambient temperature to be expected for the bearing assembly in use, with a suitable margin for safety, proves to be favorable. However, higher temperature values may alternatively be stipulated when circumstances upon assembly so require.

BRIEF DESCRIPTION OF DRAWINGS

Additional features pursuant to the invention are described below in the examples given in conjunction with the annexed drawings, wherein:

FIG. 1 is a partial longitudinal section of a bearing in a letter O arrangement according to the invention with axially-acting spacer rings of a form-memory alloy located between the inner and outer bearing rings;

FIG. 2 is a partial longitudinal section of a bearing in a letter X arrangement according to the invention with an axially-acting spacer ring of a form-memory alloy between the inside inner bearing ring and a rotatable machine member such as a shaft;

DETAILED DESCRIPTION OF PREFERRED EMBODIMENTS

Figure 3:
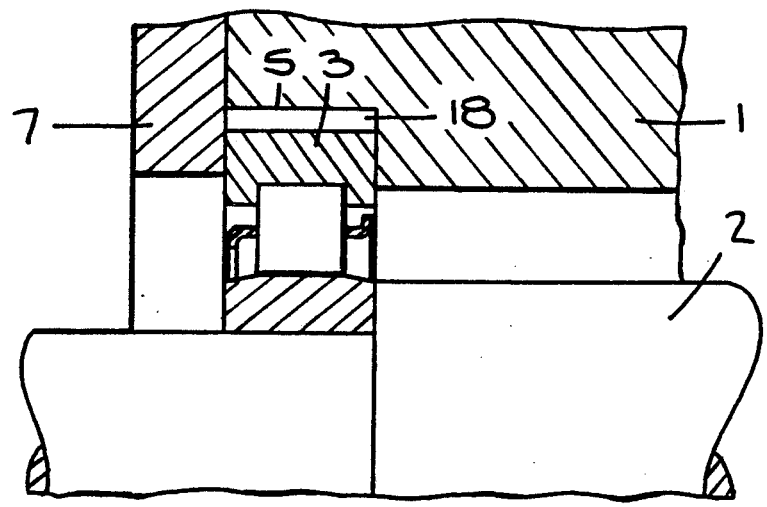
FIG. 3 is a partial longitudinal section of a bearing in accordance with the invention with a radially-acting spacer ring between the outer bearing ring and a stationary machine member such as a housing.

The bearing illustrated in FIG. 1 consists of two angular contact ball bearings, mounted in a letter O arrangement and at a distance apart, for a shaft 2 rotating in a stationary housing 1. The outer rings 3 of the bearings which form raceways for the balls are held at a distance by an annular spacer ring 4 of a form-memory alloy, introduced into the seat bore 5 of the housing 1 and secured by a cover disk 7 mounted as by screwing on the housing 1. The innermost outer bearing rings 3 adjoin a shoulder or edge surface 6 of the seat bore 5. The inner bearing rings 8 which form the other raceways for the balls are slipped onto a reduced diameter portion or lug 9 of the shaft 2, the inside or innermost inner ring 8 resting against a corresponding shoulder or edge surface 10 of the shaft 2 and the outermost inner ring 8 resting against a retaining ring 11 fixedly mounted in the groove defined between the reduced diameter portion or lug 9 of the shaft 2 and the surrounding solid part. Between the two inner rings 8 there is arranged another spacer ring 12 of a form-memory alloy which, as illustrated in the assembled bearing ready for service, holds the two inner rings 8 apart and positions them, under prestress, against the edge surface 10 or against the retaining ring 11. Thus the inner bearing rings 8 and the outer bearing rings 3 maintain a firm form-lockingly fixed axial position relative to the stationary and rotating machine members 1 and 2, respectively.

Upon assembly of the bearing, the shaft 2, with inside inner ring 8 in place and a set of balls 13 with cage 14, is first introduced into the housing 2 containing the outer bearing rings 3 separated by the spacer 4. The spacer ring 4 then has not yet been heated over its critical $A_S$ temperature and, in contrast to the one illustrated in. FIG. 1, still exhibits a small axial width, so that to begin with the outer bearing rings 3 are able to assume a position at a slight mutual distance apart. Then the spacer ring 12, likewise not yet heated above its critical $A_S$ temperature and with an axial width smaller than that shown, is slipped onto the shaft 2, followed by the outside inner ring 8 with set of balls 13 and cage 14. Owing to the smaller axial width of the spacer rings 4, 12, the outside inner ring 8 may be pushed all the way along the side 15 of the groove shown on the right-hand side in FIG. 1, so that mounting of the retaining ring 11 is possible in simple fashion without prestressing the bearing axially. After this operation, the entire bearing with housing 1 and shaft 2 is heated, for example in a reheating furnace, to over the $A_S$ temperature of, for example, 45° C. Then the axial width of the two spacer rings 4, 12 suddenly increases, whereupon the outer bearing rings 3 as well as the inner bearing rings 8 come to rest under prestress on the edge surfaces 6, 10 of shaft 2 and/or housing 1, retaining ring 11 and cover disk 7 firmly axially locking the bearings in place. FIG. 1 illustrates the position of the parts after the deformable elements, namely spacer rings 4 and 12, have expanded after heating above their $A_S$ temperature. In this described position, illustrated in FIG. 1, the bearing is ready for service. No reversible effect occurs in the spacer rings 4, 12, since their material consists of a form-memory alloy with a one-way characteristic. Thus the bearing remains in a condition ready for service even after cooling down.

In the embodiment of FIG. 2, a rolling bearing with two tapered roller bearings is provided in a letter X arrangement. The fastening of the outer bearing rings 3 (the same reference numerals are used for corresponding parts in this and the other figures) and inner bearing rings 8 almost corresponds to the example of FIG. 1. However, in this embodiment, only one spacer ring 1 of a form-memory alloy, which is arranged between an edge surface 10 on the shaft 2 side and the inside inner ring 8, is provided. The spacer rings 17 between the outer bearing rings 3 and the inner bearing rings 8 are made of conventional material with constant axial width. Owing to this arrangement, with unheated spacer ring 16 having initially a small width, the two inner bearing rings 8 with the respective ring 17 have the possibility of being displaced in the direction of the shaft-side edge surface 10. In this position, the retaining ring 11. here may likewise be conveniently mounted. Upon heating and expansion of the spacer ring 16, the inner bearing rings 8, with the intermediate spacer ring 17, are positioned against the retaining ring 11, whereby the ready-for-service condition is obtained.

In this embodiment illustrated in FIG. 3, a radially-acting spacer ring 18 of a form-memory alloy is provided between the outer bearing ring 3 of a cylindrical roller bearing and the seat 5 of a housing 1. Before heating, this spacer ring 18 has a smaller wall thickness than shown, so that the bearing can be conveniently mounted without resistance and fixed axially by a cover disk 7. Heating of the bearing to above the critical $A_S$ temperature causes the wall thickness of the spacer ring 18 to increase, resulting in firm seating of the outer bearing ring 3 in the housing 1.

Figure 4:
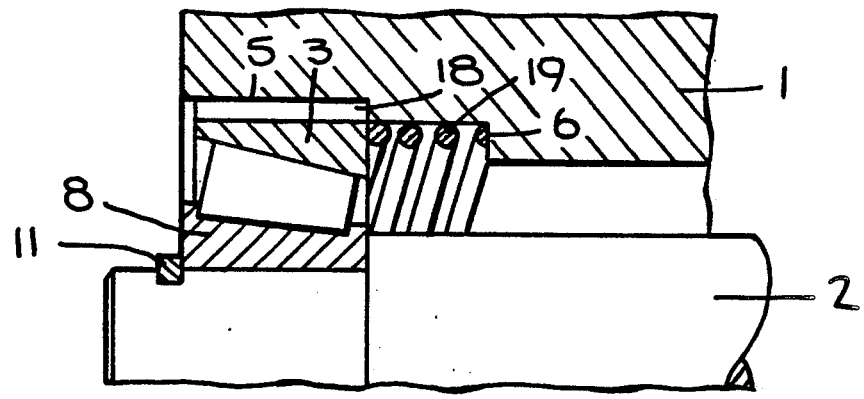
FIG. 4 is a partial longitudinal section of a bearing in accordance with the invention with a radially-acting spacer ring and an axially-acting coil spring of a form-memory alloy.

In the embodiment illustrated in FIG. 4, a radially-acting ring 18 is provided for fastening, for which the description of FIG. 3 similarly corresponds by analogy. In addition, a coil spring 19 is mounted between a shoulder or edge surface 6 of the housing 1 and the outer bearing ring 3 of the tapered roller bearing, which spring is composed of a form-memory alloy. The critical $A_S$ temperatures are predetermined so that during heating after mounting, first the coil spring 19 suddenly increases its axial length. Thus the outer bearing ring 3, by axial displacement by means of the now heavily prestressed coil spring 19, owing to its as yet loose radial seat in the spacer ring 18, is positioned against the tapered roller bearings and hence against the inner bearing ring 8. The tapered roller bearing is then adjusted free from play both axially and radially by means of the retainer 11. Upon additional heating, the $A_S$ temperature of the spacer ring 18, 10° C. higher, for example, is attained and the outer ring 3 is secured form-lockingly radially and force-lockingly axially in the position illustrated in FIG. 4.

The invention is not limited to the exemplary embodiments illustrated, and those skilled in this art will recognize that other variations and modifications will be obvious and are intended to be included within the scope of the invention as defined in the appended claims. In particular, the invention is not limited to the mounting of bearing rings as illustrated having both inner and outer bearing rings, but is also suitable for clamping or locking or fastening into operating position bearings with only one bearing ring forming a raceway for the rolling elements, the other raceway being formed directly on a shaft or in a housing.

What is claimed is:

1. A machine bearing arrangement for supporting a rotating machine member having an axis in or on a stationary machine member, said machine bearing arrangement comprising at least one bearing ring forming a raceway for rolling elements, and means for axially locking said at least one bearing ring to one of the rotating and stationary machine members, said axially locking means comprising a deformable element constituted of a form-memory alloy having a one-way characteristic.

2. A bearing according to claim 1, wherein the deformable element is constituted of a form-memory alloy having a one-way characteristic with an $A_S$ temperature of between 40° and 60° C.

3. A bearing according to claim 2 wherein the axially locking means comprises two deformable elements having different $A_S$ temperatures.

4. A bearing according to claim 1 or 2, wherein said one machine member has a fixed annular surface, and the deformable element radially fixes the said one bearing ring with respect to said fixed annular surface.

5. A bearing according to claim 1 or 2, wherein said one machine member has a firm edge surface, and the deformable element axially fixes the said one bearing ring with respect to the said firm edge surface.

6. A bearing according to claim 1 wherein the deformable element is configured as a spring.

7. A bearing according to claim 1 wherein the deformable element is configured as a ring.

8. The combination of a rotating machine member having an axis and a stationary machine member and a machine bearing for supporting the rotating machine member in or on the stationary machine member, said machine bearing comprising at least one bearing ring forming a raceway for rolling elements, and means for axially locking said one bearing ring to one of the rotating and stationary machine members, said axially locking means comprising a deformable element comprising a form-memory alloy that has been heated above its $A_S$ temperature after installation in the combination for axially locking said at least one bearing ring to one of the rotating and stationary machine members prior to the operation of said machine bearing.

9. The combination of a rotating machine member having an axis and a stationary machine member and a machine bearing for supporting the rotating machine member in or on the stationary machine member, said machine bearing comprising at least one bearing ring forming a raceway for rolling elements, and means for lockingly-securing said one bearing ring to one of the rotating and stationary machine members, said lockingly-securing means comprising a deformable element constituted of a form-memory alloy that has been heated above its $A_S$ temperature after installation in the combination.

10. The combination of claim 9 wherein the bearing comprises inner and outer bearing rings, said lockingly-securing means clamping one or both of the bearing rings to the machine members.

11. A machine bearing arrangement for supporting a rotating machine member having an axis in or on a stationary machine member, said machine bearing arrangement comprising at least one bearing ring forming a raceway for rolling elements, and means for axially locking said at least one bearing ring to one of the rotating and stationary machine members, said axially locking means comprising a deformable element comprising a form-memory alloy having a one-way characteristic.

* * * * *